(No Model.)

J. SHIELDS.
CASTING LINE OR LEADER.

No. 243,987. Patented July 5, 1881.

Witnesses.
J. C. Fiske
Charles J. Brothers

Inventor.
John Shields.
F. Curtis. Att'y.

UNITED STATES PATENT OFFICE.

JOHN SHIELDS, OF BROOKLINE, MASSACHUSETTS.

CASTING LINE OR LEADER.

SPECIFICATION forming part of Letters Patent No. 243,987, dated July 5, 1881.

Application filed September 3, 1880. (No model.)

*To all whom it may concern:*

Be it known that I, JOHN SHIELDS, a citizen of the United States, residing at Brookline, in the county of Norfolk and State of Massachusetts, have invented certain new and useful Improvements in Casting Lines or Leaders; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to casting lines or leaders for trout or bass fishing-lines, the object of the invention being to enhance the wear of the leader at the point where the upper flies are attached, as well as to enable the attachment and removal of such flies to be readily and expeditiously effected.

My invention consists in adding to a leader a re-enforce at the several points where the upper flies are to be attached, by which the size of the line at such point is doubled, the result being that the wear upon it by chafing from the loop of the fly-snell is greatly prolonged, and the doubling of the leader in the act of looping on such snell greatly facilitated.

Heretofore, in looping the upper flies of a cast about a leader of single gut, the latter soon becomes badly chafed and its enameled surface worn off. In addition to this it is difficult to hold the loop of the leader in the act of looping the snell to it sufficiently firm to easily accomplish the attachment of the fly, as a single piece of gut is not sufficiently rigid. By doubling the thickness of the leader at the point of attachment of the fly I avoid these objections.

Figure 1:
Figure 2:
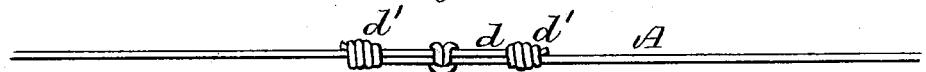
Figure 3:
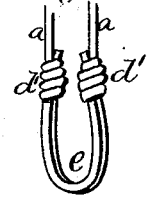

The drawings accompanying this specification represent, in Figure 1, a leader as heretofore in use. Fig. 2 is a leader made in accordance with my invention, while Fig. 3 shows the manner of looping the leader in the act of attaching the fly.

In these drawings, A, Fig. 1, denotes a leader of silk-worm gut adapted to the purposes of fly-fishing for trout, bass, &c., as heretofore made, such leader being composed of several lengths of gut knotted together, as shown at *b b*, &c., the snell attached to the fly being looped about the leader, as shown at *c*.

In carrying my invention into practice I add to the leader A at one or more points (according to the number of flies to be used in the cast in addition to the stretcher) an additional piece of gut, *d*, which I term a "re-enforce," thus doubling the body of the leader at such points. This re-enforce may be added in several ways; but a simple and easy one is that shown in Fig. 2 of the drawings, in which two adjacent ends of two strands of gut are laid side by side and knotted together, as shown at *d′ d′*. In lieu of this the re-enforce may be added by tying its opposite ends about the body of the leader, or its ends may be whipped to such body with silk.

I do not restrict myself to the precise method of attaching the re-enforce, as this may be varied considerably.

The easiest way to apply a fly, and the one generally practiced, both with my leader and those heretofore in use, is to double the leader into a loop, as shown at *e* in Fig. 3, and then apply the fly by passing such loop *e* through the loop of the snell to which the fly is attached, and after passing the fly through the loop of the leader draw the whole taut, which gives the result shown in Figs. 1 and 2.

With a single gut the act of holding the loop *e* and attaching the snell to it, as explained, is often annoying and tedious, owing to the flexibility of the gut. By doubling the leader, as explained, the loop *e* is comparatively rigid, and the looping of the fly to the leader is greatly facilitated in consequence. Owing to the double thickness which the re-enforce supplies, the wear upon the line by chafing of the snell is distributed over a larger surface, and hence the durability of the leader is greatly increased.

I claim—

In leaders for fishing-lines, the re-enforce herein described.

In testimony whereof I affix my signature in presence of two witnesses.

JOHN SHIELDS.

Witnesses:
F. CURTIS,
THOMAS TRIPP.